(12) United States Patent
Kato et al.

(10) Patent No.: US 10,312,027 B2
(45) Date of Patent: Jun. 4, 2019

(54) SOLID ELECTROLYTIC CAPACITOR INCLUDING A FLAT PLATE ANODE WIRE AND AN ANODE TERMINAL WITH A MOUNTING PORTION AND AN UPRIGHT PORTION

(71) Applicant: TOKIN CORPORATION, Sendai-shi, Miyagi (JP)

(72) Inventors: Junichi Kato, Sendai (JP); Yasuhiro Matsushima, Sendai (JP); Daisuke Takada, Sendai (JP); Kazuaki Saito, Sendai (JP)

(73) Assignee: TOKIN CORPORATION, Miyagi (JP)

( * ) Notice: Subject to any disclaimer, the term of this patent is extended or adjusted under 35 U.S.C. 154(b) by 0 days.

(21) Appl. No.: 14/818,548

(22) Filed: Aug. 5, 2015

(65) Prior Publication Data
US 2016/0093447 A1    Mar. 31, 2016

(30) Foreign Application Priority Data

Sep. 29, 2014  (JP) ................................ 2014-198807

(51) Int. Cl.
*H01G 9/15*    (2006.01)
*H01G 9/012*   (2006.01)
*H01G 9/10*    (2006.01)

(52) U.S. Cl.
CPC ............. *H01G 9/15* (2013.01); *H01G 9/012* (2013.01); *H01G 9/10* (2013.01)

(58) Field of Classification Search
CPC ............. H01G 9/012; H01G 9/10; H01G 9/15
See application file for complete search history.

(56) References Cited

U.S. PATENT DOCUMENTS 6,616,713 B2 * 9/2003 Sano ................. H01G 9/012
                                             29/25.03
7,135,754 B2   11/2006 Sano et al.
(Continued)

FOREIGN PATENT DOCUMENTS

CN    1518020 A     8/2004
CN    102683026 A   9/2012
(Continued)

OTHER PUBLICATIONS

Chinese Office Action dated Jan. 2, 2018 issued in counterpart Chinese Application No. 201510511183.8.
(Continued)

*Primary Examiner* — David M Sinclair
(74) *Attorney, Agent, or Firm* — Holtz, Holtz & Volek PC (57) ABSTRACT

A solid electrolytic capacitor includes: a capacitor element including a sintered compact of a valve action metal, a dielectric layer, an electrolyte layer, and a cathode layer sequentially formed over a surface of the sintered compact, and an anode wire drawn out of the sintered compact; an anode terminal; a cathode terminal; and an exterior resin. The anode terminal includes a mounting portion and an upright portion. The upright portion has a trapezoidal shape. A length of a welding surface corresponding to an edge of the upright portion on the anode wire side is set to be longer than a length of the upright portion on the mounting portion side and to be longer than a width of the anode wire.

2 Claims, 3 Drawing Sheets

(56) References Cited

U.S. PATENT DOCUMENTS

| | | | |
|---|---|---|---|
| 7,337,513 B2 | 3/2008 | Sano et al. | |
| 8,514,550 B2 | 8/2013 | Vyroubal | |
| 8,582,278 B2 | 11/2013 | Zednicek | |
| 8,587,927 B2 * | 11/2013 | Sugimura | H01G 9/028 361/523 |
| 2002/0001167 A1 | 1/2002 | Kida et al. | |
| 2002/0163775 A1 * | 11/2002 | Maeda | H01G 9/0029 361/528 |
| 2003/0151884 A1 | 8/2003 | Matsumoto | |
| 2003/0174460 A1 * | 9/2003 | Sano | H01G 9/012 361/523 |
| 2004/0136144 A1 * | 7/2004 | Hirota | H01G 9/04 361/523 |
| 2004/0145065 A1 * | 7/2004 | Sano | H01G 9/012 257/787 |
| 2006/0270115 A1 | 11/2006 | Sano et al. | |
| 2008/0019081 A1 * | 1/2008 | Kim | H01G 2/06 361/535 |
| 2008/0106854 A1 * | 5/2008 | Ishijima | H01G 2/065 361/538 |
| 2009/0147447 A1 * | 6/2009 | Matsuoka | H01G 9/012 361/540 |
| 2010/0110615 A1 | 5/2010 | Nishimura et al. | |
| 2012/0039019 A1 * | 2/2012 | Zednickova | H01G 9/0003 361/529 |
| 2012/0229956 A1 | 9/2012 | Zednicek | |
| 2012/0229957 A1 * | 9/2012 | Vyroubal | H01G 9/012 361/540 |
| 2014/0043730 A1 * | 2/2014 | Kim | H01G 9/042 361/529 |
| 2015/0077904 A1 * | 3/2015 | Kwak | H01G 9/012 361/528 |
| 2015/0116909 A1 * | 4/2015 | Kwak | H01G 9/042 361/529 |

FOREIGN PATENT DOCUMENTS

| | | | | |
|---|---|---|---|---|
| CN | 102683027 A | | 9/2012 | |
| CN | 103578767 A | | 2/2014 | |
| JP | 01123332 U | | 8/1989 | |
| JP | 2000012387 A | * | 1/2000 | |
| JP | 2002015953 A | | 1/2002 | |
| JP | 2002043175 A | | 2/2002 | |
| JP | 2003068576 A | | 3/2003 | |
| JP | 2003100556 A | | 4/2003 | |
| JP | 2003197484 A | | 7/2003 | |
| JP | 2005079357 A | * | 3/2005 | |
| JP | 2005093819 A | | 4/2005 | |
| JP | 2005228801 A | * | 8/2005 | |
| JP | 2005353709 A | * | 12/2005 | |
| JP | 2007317784 A | * | 12/2007 | H01G 9/012 |
| JP | 2010135750 A | | 6/2010 | |

OTHER PUBLICATIONS

Chinese Office Action (and English language translation thereof) dated Oct. 25, 2018 issued in counterpart Chinese Application No. 201510511183.8.

* cited by examiner

SOLID ELECTROLYTIC CAPACITOR INCLUDING A FLAT PLATE ANODE WIRE AND AN ANODE TERMINAL WITH A MOUNTING PORTION AND AN UPRIGHT PORTION

This application is based upon and claims the benefit of priority from Japanese Patent Application No. 2014-198807, filed on Sep. 29, 2014, the disclosure of which is incorporated herein in its entirety by reference.

BACKGROUND OF THE INVENTION

1. Field of the Invention

This invention relates to a solid electrolytic capacitor, and more particularly, to a solid electrolytic capacitor suitable for a chip-type solid electrolytic capacitor.

2. Description of the Related Art

As a chip-type solid electrolytic capacitor, there is generally known a configuration in which a capacitor element and part of an anode terminal and part of a cathode terminal are covered by an exterior resin. In such capacitors, exposed bottoms of an anode terminal and a cathode terminal serve as mounting surfaces for a board to be mounted.

A configuration disclosed in Japanese Unexamined Patent Application Publication (JP-A) No. 2003-068576 (Patent Literature 1) is given as an example of the related-art solid electrolytic capacitor. In Patent Literature 1, a solid electrolytic capacitor includes an anode terminal having a flat plate portion and a rise portion perpendicular to the flat plate portion, and an anode rod of a capacitor element is fixed to the rise portion at a groove thereof. A bottom of the flat plate portion of the anode terminal provides a mounting portion of the anode terminal and the flat plate is positioned on the opposite side of the capacitor element relative to the rise portion.

Moreover, a configuration disclosed in Japanese Unexamined Patent Application Publication (JP-A) No. 2003-100556 (Patent Literature 2) is given as another example. In Patent Literature 2, the capacitor includes an anode terminal having a planar terminal portion and a rise portion perpendicular to the terminal portion and an anode lead of a capacitor element is fixed to the rise portion. A bottom of the terminal portion provides a mounting portion to be connected to an external. The terminal portion of the anode terminal extends on a side of the capacitor element relative to the rise portion

SUMMARY

The capacitor of Patent Literature 1 has difficulty in increasing a volume size of the capacitor element to an entire volume of the capacitor to increase an area of the mounting portion, resulting from the flat plate being positioned only on the opposite side of the capacitor element relative to the rise portion.

In the capacitor of Patent Literature 2, there is a possibility of providing an increased area of the mounting portion and improving an occupying volume efficiency of the capacitor element since the terminal portion of the anode terminal extends on the capacitor element side. However, there is a restriction to an increase in the mounting area because the rise portion is formed by raising a cut-in portion with a rectangular shape, resulting in self-alignment property with a board to be soldered being degraded.

The invention provides a solid electrolytic capacitor that has an improved ability of self-alignment in mounting the capacitor on a board and a sufficient welding strength between an anode wire and an anode terminal.

According to an aspect of the invention, there is provided a solid electrolytic capacitor comprising: a capacitor element including a sintered compact of a valve action metal serving as an anode, a dielectric layer, an electrolyte layer, and a cathode layer sequentially formed over a surface of the sintered compact, and an anode wire drawn out of the sintered compact; an anode terminal connected to the anode wire; a cathode terminal connected to the cathode layer; and an exterior resin for covering the capacitor element, part of the anode terminal, and part of the cathode terminal. The anode terminal includes a mounting portion and an upright portion that is raised from the mounting portion toward the anode wire of the capacitor element. The upright portion includes a main surface and a side surface wherein a length of an edge of the main surface on the anode wire side is longer than a length of an edge of the main surface on the mounting portion side, and wherein the length of the edge of the main surface on the anode wire side is longer than a width of the anode wire connected to the upright portion.

In an embodiment of this invention, in a main surface of an upright portion of an anode terminal, a length of an edge of the upright portion on an anode wire side is longer than a length of an edge of the upright portion on a mounting portion side. Accordingly, a mounting area to a board may be sufficiently ensured and a self-alignment property of the solid electrolytic capacitor in mounting on the board may be achieved.

In an embodiment, the length of the edge on the anode wire side may be set longer, and hence the solid electrolytic capacitor may employ anode wires having various shapes.

Moreover, in the main surface, the length of the edge on the anode wire side is longer than a width of the anode wire connected to the upright portion, and hence a welding strength between the anode terminal and the anode wire may be obtained. Further, a sufficient welding strength may be obtained also when a flat plate-like anode wire having a wider width is used.

According to another aspect of the invention, a solid electrolytic capacitor, includes: a capacitor element including a sintered compact of a valve action metal serving as an anode, a dielectric layer, an electrolyte layer, and a cathode layer sequentially formed over a surface of the sintered compact, and an anode wire drawn out of the sintered compact; an anode terminal connected to the anode wire; a cathode terminal connected to the cathode layer; and an exterior resin for covering the capacitor element, part of the anode terminal, and part of the cathode terminal. The anode terminal includes a mounting portion and an upright portion that is raised from the mounting portion toward the anode wire of the capacitor element, wherein a length of an upper part of the upright portion is longer than a length of a lower part of the upright portion, and wherein the length of the upper part of the upright portion is longer than a width of the anode wire connected to the upright portion.

In an embodiment, the upright portion may have a trapezoidal shape.

Further, in an embodiment, the upright portion may be formed by bending part of a metal piece toward the anode wire, the metal piece configuring the mounting portion and the upright portion.

In an embodiment, the mounting portion may incorporate an uneven portion formed on a side surface of the part of the mounting portion covered by the exterior resin.

In an embodiment, the anode terminal may have a terminal expansion portion, and

As described above, it is possible to obtain the solid electrolytic capacitor that has the self-alignment property in mounting and the sufficient welding strength between the anode wire and the anode terminal.

DETAILED DESCRIPTION OF THE EXEMPLARY EMBODIMENTS

First Embodiment

Figure 1:
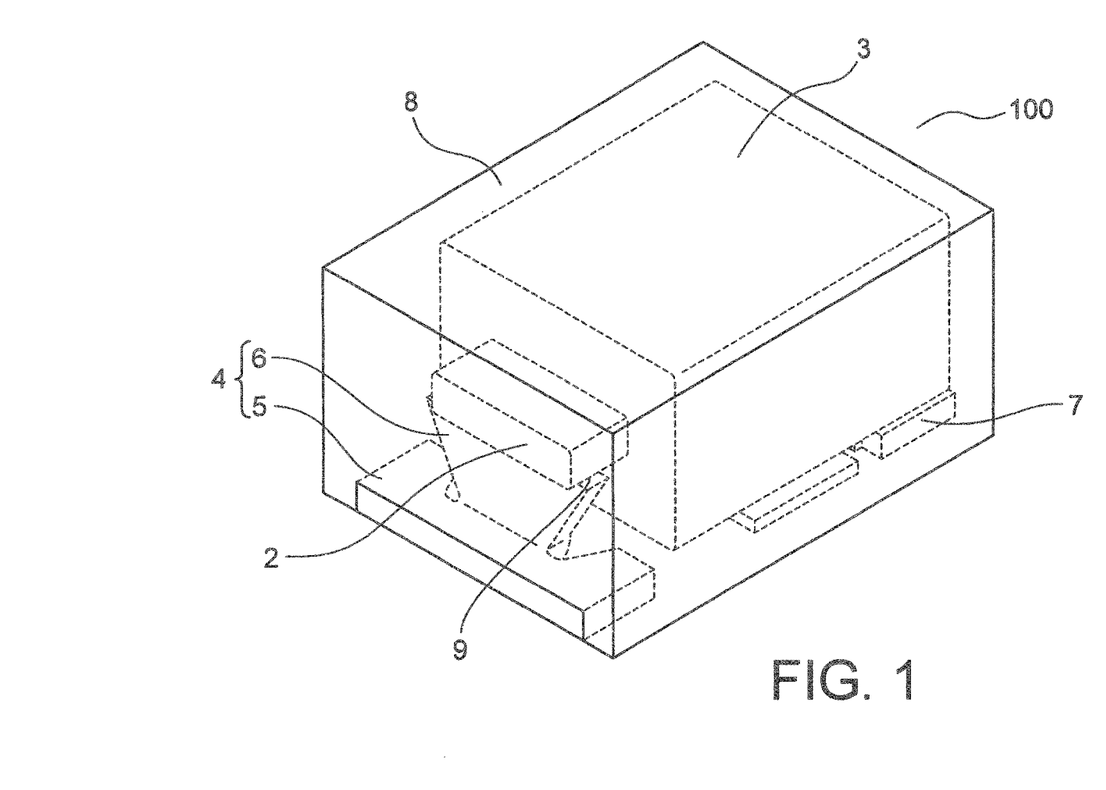
FIG. 1 is a perspective view for illustrating a solid electrolytic capacitor according to a first embodiment of this invention.
Figure 2:
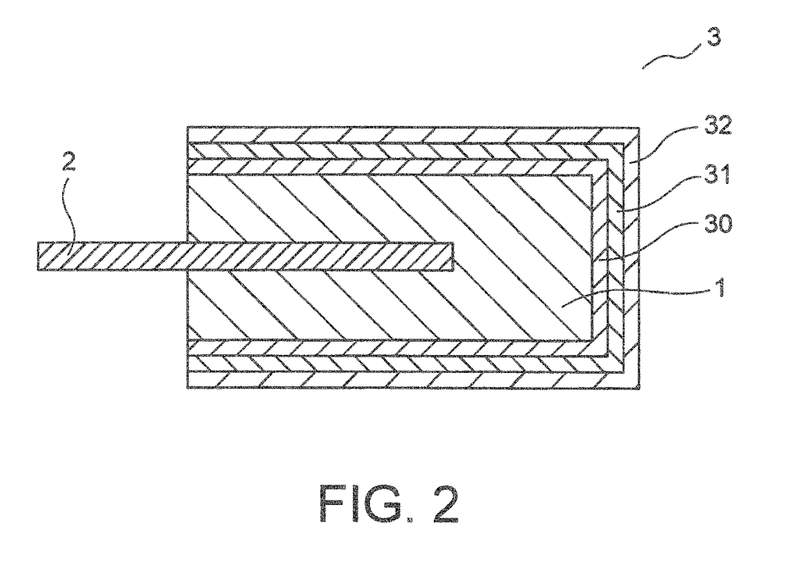
FIG. 2 is a longitudinal sectional view for illustrating a capacitor element used in embodiments.

FIG. 1 is a perspective view for illustrating a solid electrolytic capacitor according to a first embodiment of this invention. The solid electrolytic capacitor according to the first embodiment of this invention is described with reference to FIGS. 1 and 2. As illustrated in FIG. 1, a solid electrolytic capacitor 100 of this embodiment includes a capacitor element 3, an anode terminal 4, a cathode terminal 7, and an exterior resin 8. In FIG. 2, the capacitor element 3 has an anode body 1, or a sintered compact 1 of valve action metal powder, which anode body or compact serves as an anode. The capacitor element 3 has a flat plate-like anode wire 2 delivered from the anode body 1.

Over a surface of the sintered compact 1 obtained by molding valve action metal powder and sintering the resultant at high temperature, there are formed sequentially a dielectric layer 30 including an oxide film and the like, an electrolyte layer 31 including a conductive polymer layer and the like, and a cathode layer 32 including a graphite layer and a silver layer.

The anode terminal 4 has a mounting portion 5 and an upright portion 6 that is raised from the mounting portion 5 toward the anode wire 2 of the capacitor element 3. The upright portion 6 has a main surface and side surfaces. The upright portion has a surface, opposed to the main surface, which has the same shape as the main surface. In the main surface, a length of an edge of the upright portion 6 on the anode wire 2 side is longer than a length of an edge of the upright portion 6 on the mounting portion 5 side, and the main surface of the upright portion 6 has a trapezoidal shape. That is, in a direction substantially perpendicular to an axial direction of extracting the anode wire 2, a length of a welding surface 9 corresponding to the edge of the upright portion 6 on the anode wire 2 side is set to be longer than the length of the edge of the upright portion 6 on the mounting portion 5 side.

Moreover, the length of the edge of the main surface of the upright portion 6 on the anode wire 2 side, namely, the length of the welding surface 9 of the upright portion 6 in the direction substantially perpendicular to the extraction axial direction, is set to be longer than a width of the anode wire 2 to be connected to the welding surface 9.

The cathode terminal 7 is connected to the cathode layer 32 over the anode body 1 with the use of a well-known technology such as using a conductive adhesive, and the anode terminal 4 is connected to the anode wire 2 on the welding surface 9 of the upright portion 6 with the use of a well-known technology such as resistance welding or laser welding.

The exterior resin 8 covers the components so that the capacitor element 3, the upright portion 6, part of the mounting portion 5, and part of the cathode terminal 7 are integrated, to thereby obtain the solid electrolytic capacitor 100. In this embodiment, the part of the mounting portion 5 is each surface of the mounting portion 5 other than a surface thereof to be mounted on a board, and the part of the cathode terminal 7 is each surface of the cathode terminal 7 other than a surface thereof to be mounted on the board. That is, the components are sealed by the exterior resin so that the surfaces of the anode terminal 4 and the cathode terminal 7 that are to be mounted on the board are exposed, to thereby obtain the solid electrolytic capacitor.

In the main surface of the upright portion of the anode terminal, the length of the edge on the anode wire side is set to be longer than the length of the edge on the mounting portion side, and hence an area of the mounting portion can be sufficiently increased and a self-alignment property of the solid electrolytic capacitor in mounting on the board is improved. Moreover, the solid electrolytic capacitor can employ anode wires having various shapes.

When the anode terminal and the anode wire are welded, the anode terminal is temporarily melted due to heat or a pressure of the welding. Therefore, with the configuration in which the length of the edge of the main surface of the upright portion on the anode wire side is set to be longer than the width of the anode wire connected to the upright portion, part of the anode terminal flows along an outer periphery of the anode wire. That is, the part of the anode terminal, which is the part other than the contact surface before the anode terminal and the anode wire are welded, is in contact with the anode wire after the welding, and hence the welding strength between the anode terminal and the anode wire can be obtained, to thereby suppress a welding defect. Further, a stronger welding strength is obtained when the flat plate-like anode wire having a wider width is used.

In this case, the upright portion 6 of the anode terminal 4 may be formed by raising part of a plate-like metal piece on the anode wire side while the mounting portion is formed of unraised part of the plate-like metal piece. In the alternative, the upright portion 6 of the anode terminal 4 may be formed by welding another member to a mounting portion. That is, a pair of slits may be formed in part of the plate-like metal piece and a region, or part of the plate-like metal piece, surrounded by the pair of slits may be bent at the edge of the region which is to be bordered by the mounting portion, to thereby form the mounting portion and the upright portion, or different members may be welded, to thereby form the mounting portion and the upright portion.

Second Embodiment

Figure 3:
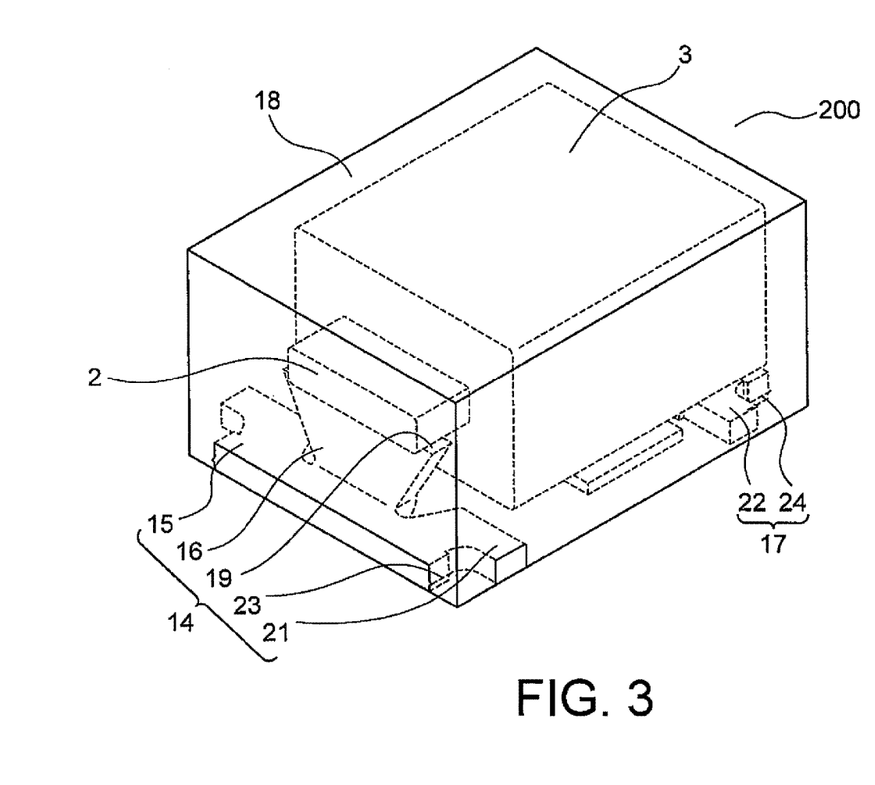
FIG. 3 is a perspective view for illustrating a solid electrolytic capacitor according to a second embodiment of this invention.

FIG. 3 is a perspective view for illustrating a solid electrolytic capacitor according to a second embodiment of this invention. The solid electrolytic capacitor according to the second embodiment of this invention is described with reference to FIG. 3. As illustrated in FIG. 3, a solid electrolytic capacitor 200 of this embodiment includes, a capacitor element 3, an anode terminal 14, a cathode terminal 17, and an exterior resin 18. As the capacitor element, the one as shown in FIG. 2 is used. That is, the capacitor element 3 has an anode body 1, or a sintered compact 1, of valve action metal powder, which anode body or compact serves as an anode. The capacitor element 3 has a flat plate-like anode wire 2 delivered from the anode body 1.

Over a surface of the sintered compact 1 obtained by molding valve action metal powder and sintering the resultant at high temperature, there are formed sequentially a dielectric layer 30 including an oxide film and the like, an electrolyte layer 31 including a conductive polymer layer and the like, and a cathode layer 32 including a graphite layer and a silver layer.

The anode terminal 14 has a mounting portion 15 and an upright portion 16 that is raised from the mounting portion 15 toward the anode wire 2 of the capacitor element 3. The upright portion 16 has a main surface and side surfaces. The upright portion has a surface, opposed to the main surface, which has the same shape as the main surface. In the main surface, a length of an edge of the upright portion 16 on the anode wire 2 side is longer than a length of an edge of the upright portion 16 on the mounting portion 15 side, and the main surface of the upright portion 16 has a trapezoidal shape. That is, in a direction substantially perpendicular to an axial direction of extracting the anode wire 2, a length of a welding surface 19 corresponding to the edge of the upright portion 16 on the anode wire 2 side is set to be longer than the length of the edge of the upright portion 16 on the mounting portion 15 side.

Moreover, the length of the edge of the main surface of the upright portion 16 on the anode wire 2 side, namely, the length of the welding surface 19 of the upright portion 16 in the direction substantially perpendicular to the extraction axial direction, is set to be longer than a width of the anode wire 2 to be connected to the welding surface 19.

Moreover, the mounting portion 15 of the anode terminal 14 has an anode terminal expansion portion 21 which expands larger at least in a lateral direction perpendicular to a longitudinal axis of the capacitor element to be fixed than the remaining part of the mounting portion. The expansion portion is formed on the same plane as the remaining part of the mounting portion. The expansion portion 21 serves to increase a further mounting area of the anode terminal to be mounted on the board.

Similarly, a mounting portion of the cathode terminal 17 has a cathode terminal expansion portion 22 which expands larger at least in the lateral direction perpendicular to the longitudinal axis of the capacitor element 13 to be fixed than the remaining part of the mounting portion of the cathode terminal. The expansion portion 22 is formed on the same plane as the remaining part of the cathode mounting portion. The expansion portion 22 serves to increase a further mounting area of the cathode terminal.

Moreover, uneven portions are formed on part of a side surface of the cathode terminal and part of a side surface of the mounting portion of the anode terminal. The configuration of the second embodiment is similar to that of the first embodiment except for the terminal expansion portion and the uneven portion.

The anode terminal 14 and the cathode terminal 17 respectively have the terminal expansion portions 21 and 22 each formed on the same plane as the surface to be mounted on the board, and hence the mounting area is increased and the self-alignment property in mounting on the board is improved. Moreover, it is possible to suppress occurrence of a thin burr of the exterior resin on the surface to be mounted on the board, during the step of covering the capacitor element 13, the part of the anode terminal 14, and the part of the cathode terminal 17 by the exterior resin 18 to be integrated, that is, when the exterior resin is formed.

The terminal expansion portions 21 and 22 of this embodiment have the shapes that are respectively obtained by expanding, in the direction substantially perpendicular to the axial direction of extracting the anode wire 2, the part of the mounting portion 15 and the part of the cathode terminal, but the direction in which the terminal expansion portion is formed and the shape thereof are not limited thereto. That is, the forming direction and the shape are not limited as long as insulation from the anode body is ensured, and it is only required for the terminal expansion portion to increase the mounting area to the board. Thus, the terminal expansion portion may be extracted in the axial direction of extracting the anode wire, and the shape of the terminal expansion portion is not limited to a quadrangle and may be a semicircle, a circle, or the like, which does not have any corner.

Further, the side surface of the part of the mounting portion 15 has an uneven portion 23, and the side surface of the part of the cathode terminal 17 has an uneven portion 24, the parts of the mounting portion 15 and the cathode terminal 17 being covered by the exterior resin 18. The uneven portion is formed on the part of the side surface of each of the anode terminal and the cathode terminal, which is covered by the exterior resin, and hence an anchor effect is obtained to improve adhesiveness between the exterior resin and the anode terminal and between the exterior resin and the cathode terminal.

The uneven portion is formed on at least one side surface of the mounting portion covered by the exterior resin. It is preferred that the uneven portion has a ridge formed on the side surface of the mounting portion which ridge runs in parallel with a bottom surface of the mounting portion and in the direction of a longitudinal axis of the capacitor. Accordingly, the adhesiveness in a direction perpendicular to the mounting surface is improved between the exterior resin and the anode terminal and between the exterior resin and the cathode terminal.

Moreover, in this embodiment, the terminal expansion portions and the uneven portions are formed for both of the anode terminal and the cathode terminal, but this invention is not limited thereto. That is, the terminal expansion portion and the uneven portion may be formed for only one of the anode terminal and the cathode terminal. Alternatively, only the terminal expansion portion or the uneven portion may be formed such as forming the terminal expansion portion for the anode terminal and forming the uneven portion for the cathode terminal. In other words, the terminal expansion portion and the uneven portion may be formed appropriately depending on specifications such as forming the terminal expansion portion for a terminal that requires the suppression of the burr of the exterior resin and the improvement of the self-alignment property, and forming the uneven portion for a terminal that requires the improvement of the adhesiveness with the exterior resin.

Third Embodiment

A solid electrolytic capacitor according to a third embodiment of this invention includes a capacitor element, an anode terminal, a cathode terminal, and an exterior resin. The capacitor element has an anode body, or a sintered compact of valve action metal powder, which anode body or compact serves as an anode. The capacitor element has a circular anode wire delivered from the anode body.

The anode terminal has a mounting portion and an upright portion that is raised from the mounting portion toward the anode wire of the capacitor element. In this case, the upright portion is connected to the mounting portion by welding. In other words, the anode terminal is formed by connecting the upright portion and the mounting portion to each other by welding, which are different members.

The upright portion has a main surface and side surfaces. The upright portion has a surface, opposed to the main surface, which has the same shape as the main surface. A length of an edge of the main surface on the anode wire side is longer than a length of an edge of the main surface on the mounting portion side, and the main surface of the upright portion has a trapezoidal shape with legs having angles changed in two stages. That is, in a direction substantially perpendicular to an axial direction of extracting the anode wire, a length of a welding surface corresponding to the edge of the upright portion on the anode wire side is set to be longer than the length of the edge of the upright portion on the mounting portion side.

Moreover, a U-shaped groove is formed in the welding surface of the upright portion. The anode terminal is connected to the anode wire fitted into the U-shaped groove with the use of a well-known technology. The remaining configuration is similar to that of the first embodiment.

Fourth Embodiment

A solid electrolytic capacitor according to a fourth embodiment of this invention includes a capacitor element, an anode terminal, a cathode terminal, and an exterior resin. The capacitor element has an anode body, or a sintered compact of valve action metal powder, which anode body or compact serves as an anode. The capacitor element has a flat plate-like anode wire delivered from the anode body.

The anode terminal has a mounting portion and an upright portion that is raised from the mounting portion toward the anode wire of the capacitor element. In this case, the upright portion is formed by raising part of a plate-like metal piece on the anode wire side while the mounting portion is formed of unraised part of the plate-like metal piece. Specifically, a pair of slits is formed in part of the plate-like metal piece and a region, or part of the plate-like metal piece, surrounded by the pair of slits is bent at the edge of the region which is to bordered by the mounting portion, to thereby form the mounting portion and the upright portion.

The upright portion has a main surface and side surfaces. A length of an edge of the main surface on the anode wire side is longer than a length of an edge of the main surface on the mounting portion side, and the main surface of the upright portion has a trapezoidal shape with curved legs that are curved inwardly. That is, in a direction substantially perpendicular to an axial direction of extracting the anode wire, a length of a welding surface corresponding to the edge of the upright portion on the anode wire side is set to be longer than the length of the edge of the upright portion on the mounting portion side.

Moreover, a groove is formed in the welding surface of the upright portion. The anode terminal is connected to the anode wire fitted into the groove with the use of a well-known technology. The remaining configuration is similar to that of the first embodiment.

When the upright portion is formed by raising the part of the metal piece, it is easy to form the upright portion, resulting in easy manufacturing. This is because the bending part of the metal piece to be bent from the remaining part of the metal piece has a shorter length in a border of the bending part and the remaining part than at an edge of the bending part opposed to the border of bending part and the remaining part, namely, a dimension of the edge of the upright portion on the mounting portion side is smaller than that on the anode wire side. Further, variations due to the bending can be suppressed.

In each of the embodiments of this invention, a flat plate-like anode wire or a circular anode wire is used, but this invention is not limited thereto. For example, the anode wire may have an elliptical shape in section. In this case, it is preferred that a V-shaped slit, a U-shaped slit, or the like be formed in the welding surface for facilitating the positioning of the anode terminal and the anode wire. Moreover, also in the case of the flat plate-like anode wire, a slit may be formed in the welding surface to perform the positioning.

Further, the number of the anode wires has no limitation. The anode wire may be formed by tying a plurality of thin anode wires or may be formed as a plurality of separate anode wires to be connected to the anode terminal.

In this case, regardless of the shape of the anode wire and the like, it is desired that the welding strength between the anode terminal and the anode wire be 1 N or more with which occurrence of a welding defect between the anode terminal and the anode wire can be suppressed.

Moreover, in each of the embodiments of this invention, the shape of the main surface of the upright portion is an isosceles trapezoid or a trapezoidal shape with legs having angles changed in two stages, but this invention is not limited thereto. That is, the main surface may have any shape as long as a shape can prevent such a situation that the shape of the upright portion is greatly deformed due to welding heat or a pressure applied thereto when the anode terminal and the anode wire are welded, resulting in reduction in welding strength. For example, the main surface may have a T-shape, or a hole passing through the main surface may be formed in part of the upright portion.

As described above, the shape of the upright portion has no limitation, but it is preferred that the upright portion have a trapezoidal shape with which the deformation during the welding can be suppressed and the welding strength can be obtained. In this case, the trapezoidal shape is not limited to an isosceles trapezoid and shapes of legs of the trapezoid have no limitation. That is, the legs may be curved on the inner side of the trapezoid, or the angles of the legs of the trapezoid may change in two stages or more.

Next, a solid electrolytic capacitor according to Example 1 of this invention and a solid electrolytic capacitor according to each of Comparative Examples 1 and 2 of this invention are described.

Example 1

An anode body was obtained by pressurizing and molding tantalum powder into which an anode wire made of tantalum and having a width of about 1.36 mm was inserted, followed by sintering of the resultant at high temperature. On the obtained anode body, a dielectric layer including a tantalum oxide film, a solid electrolyte layer including a conductive polymer layer, and a cathode layer including a graphite layer and a silver layer were formed by a well-known method, to thereby obtain a capacitor element.

Subsequently, a copper plate having a thickness of about 0.21 mm was used to form an anode terminal and a cathode terminal. A pair of slits was formed in part of the copper plate for the anode terminal to form an upright portion. In a main surface of the upright portion of the anode terminal, a length of an edge of the upright portion on the anode wire side was set to be about 1.55 mm, and a length of an edge of the upright portion on the mounting portion side was set to be about 0.80 mm. The main surface had an isosceles trapezoidal shape. An angle of a leg of the isosceles trapezoid from the mounting portion was about 28° and an angle between the two legs was about 124°.

Next, the anode wire and a welding surface of the upright portion were subjected to resistance welding. At this time, a welding position was adjusted so that the center of the anode wire in a width direction thereof and the center of the edge of the upright portion on the anode wire side matched with each other. A cathode terminal was connected to a cathode layer through a conductive adhesive.

Two components in each of which the anode terminal and the cathode terminal were connected to the capacitor element were manufactured.

Subsequently, a solid electrolytic capacitor of this example was obtained by covering the capacitor element, the upright portion, part of the mounting portion, and part of the cathode terminal of one of the two components by an exterior resin made of an epoxy resin, followed by heating and curing of the resultant.

Comparative Example 1

The following is given as Comparative Example 1. A copper plate having a thickness of about 0.21 mm was used to form an anode terminal and a cathode terminal. A pair of slits was formed in the part of the copper plate for the anode terminal to form a rectangular upright portion having a width of about 1.55 mm. That is, in a main surface of the upright portion of the anode terminal, a length of an edge of the upright portion on an anode wire side and a length of an edge of the upright portion on a mounting portion side were set to be the same.

Through the same manufacturing process as Example 1 other than the above, one component in which the anode terminal and the cathode terminal were connected to the capacitor element was obtained, and further one solid electrolytic capacitor was obtained by covering a similar component by an exterior resin.

Comparative Example 2

The following is given as Comparative Example 2. A copper plate having a thickness of about 0.21 mm was used to form an anode terminal and a cathode terminal. A pair of slits was formed in the part of the copper plate for the anode terminal to form a rectangular upright portion having a width of about 0.70 mm. That is, in a main surface of the upright portion of the anode terminal, a length of an edge of the upright portion on an anode wire side and a length of an edge of the upright portion on a mounting portion side were set to be the same.

Through the same manufacturing process as Example 1 other than the above, one component in which the anode terminal and the cathode terminal were connected to the capacitor element was obtained, and further one solid electrolytic capacitor was obtained by covering a similar component by an exterior resin.

The component of each of Example and Comparative Examples immediately before being covered by the exterior resin was used to check a welding strength between the anode terminal and the anode wire: while holding the capacitor element, a load of 1 N was applied to the anode terminal in a direction of separating the upright portion from the anode wire.

Moreover, the solid electrolytic capacitor of each of Example and Comparative Examples was arranged on a land having an area of 3.64 mm². At this time, the solid electrolytic capacitor was arranged so that the central axis of the solid electrolytic capacitor in the width direction of the anode wire was shifted by 0.5 mm from the central axis of the land in the same direction.

After that, reflow soldering was performed, and a self-alignment property of the solid electrolytic capacitor was checked. Moreover, an area S of the mounting portion opposite to and in contact with the land after the reflow soldering was calculated, to thereby obtain a ratio S/L of the area of the mounting portion opposite to and in contact with the land to a land area L of the board.

The results are shown in Table 1. With regard to the welding strength, a case in which the welding between the anode terminal and the anode wire was not separated is represented by ○, whereas a case in which the welding between the anode terminal and the anode wire was separated is represented by ×. Moreover, with regard to the self-alignment property, a case in which the shift of the position was corrected after the reflow soldering is represented by ○, whereas a case in which, because the solid electrolytic capacitor was tilted and the like, the shift of the position was not corrected after the reflow soldering is represented by ×.

TABLE 1

|  | Area S (mm²) | Ratio S/L (%) | Self-alignment property | Welding strength |
| --- | --- | --- | --- | --- |
| Example 1 | 1.13 | 31.0 | ○ | ○ |
| Comparative Example 1 | 0.97 | 26.6 | × | ○ |
| Comparative Example 2 | 1.16 | 31.8 | ○ | × |

In Comparative Example 1, the length of the edge of the main surface of the upright portion on the anode wire side was set to be longer than the width of the anode wire, and hence the sufficient welding strength was able to be obtained. However, the slits were perpendicularly formed, and hence the length of the edge of the main surface on the anode wire side and the length of the edge of the main surface on the mounting portion side were the same. Accordingly, a mounting area in which the mounting portion of the anode terminal and the land were connected to each other was small, resulting in reduction in self-alignment property in mounting on the board.

Moreover, in Comparative Example 2, the width of the upright portion was set to be narrow. Accordingly, the mounting area was able to be sufficiently ensured and the sufficient self-alignment was achieved, but the welding strength was not able to be obtained because the length of the edge of the main surface on the anode wire side was shorter than the width of the anode wire.

On the other hand, in the solid electrolytic capacitor of this invention, in the main surface of the upright portion of the anode terminal, the length of the edge on the anode wire side was longer than the length of the edge on the mounting portion side, and the length of the edge of the main surface on the anode wire side was longer than the width of the anode wire connected to the upright portion. Accordingly, both of the sufficient self-alignment and the sufficient welding strength were able to be achieved.

As described above, it is possible to obtain the solid electrolytic capacitor that has the self-alignment property in mounting and the sufficient welding strength between the anode wire and the anode terminal.

Although this invention has been described in conjunction with exemplary embodiments thereof, it will be appreciated by those skilled in the art that those embodiments are provided for illustrating the invention, and should not be relied upon to construe the appended claims in a limiting sense.

What is claimed is:

1. A solid electrolytic capacitor, comprising:
   a capacitor element including a sintered compact of a valve action metal serving as an anode, a dielectric layer, an electrolyte layer, and a cathode layer formed over a surface of the sintered compact, and an anode wire drawn out of the sintered compact;
   an anode terminal connected to the anode wire;
   a cathode terminal connected to the cathode layer; and
   an exterior resin covering the capacitor element, part of the anode terminal, and part of the cathode terminal,
   wherein the anode terminal comprises a mounting portion and an upright portion that is raised from the mounting portion toward the anode wire of the capacitor element, the upright portion including a main surface and a side surface,
   wherein the anode wire comprises a flat plate,
   wherein a length of an edge of the main surface on the anode wire side is longer than a length of an edge of the main surface on the mounting portion side,
   wherein the length of the edge of the main surface on the anode wire side is longer than a width of the anode wire connected to the upright portion,
   wherein the upright portion is formed by bending part of a metal piece toward the anode wire, the metal piece configuring the mounting portion and the upright portion,
   wherein the metal piece has an exterior side and an interior side that is closer to the capacitor element than the exterior side is, and the part of the metal piece that is bent to form the upright portion is at the interior side of the metal piece such that the upright portion is formed by bending the part of the metal piece from the interior side of the metal piece toward the exterior side of the metal piece,
   wherein the main surface comprises a trapezoidal shape,
   wherein the mounting portion comprises an uneven portion formed on a side surface of part of the mounting portion at a longitudinal end of the solid electrolytic capacitor, and the exterior resin covers the uneven portion,
   wherein the mounting portion of the anode terminal further comprises a terminal expansion portion, which is part of the metal piece configuring the mounting portion and the upright portion,
   wherein the terminal expansion portion is formed on a first plane, on which the mounting portion is also formed,
   wherein the terminal expansion portion extends in a lateral direction which is parallel to a shorter dimension of the solid electrolytic capacitor, the lateral direction being perpendicular to a longitudinal direction which is parallel to a longer dimension of the solid electrolytic capacitor,
   wherein the terminal expansion portion is exposed at a side surface of the solid electrolytic capacitor in a second plane which extends in the longitudinal direction and intersects the first plane, and
   wherein the upright portion is closer to the exterior side than the terminal expansion portion is.

2. A solid electrolytic capacitor, comprising:
   a capacitor element including a sintered compact of a valve action metal serving as an anode, a dielectric layer, an electrolyte layer, and a cathode layer formed over a surface of the sintered compact, and an anode wire drawn out of the sintered compact;
   an anode terminal connected to the anode wire;
   a cathode terminal connected to the cathode layer; and
   an exterior resin covering the capacitor element, part of the anode terminal, and part of the cathode terminal,
   wherein the anode terminal comprises a mounting portion and an upright portion that is raised from the mounting portion toward the anode wire of the capacitor element,
   wherein the anode wire comprises a flat plate,
   wherein a length of an upper part of the upright portion is longer than a length of a lower part of the upright portion,
   wherein the length of the upper part of the upright portion is longer than a width of the anode wire connected to the upright portion,
   wherein the upright portion is formed by bending part of a metal piece toward the anode wire, the metal piece configuring the mounting portion and the upright portion, wherein the metal piece has an exterior side and an interior side that is closer to the capacitor element than the exterior side is, and the part of the metal piece that is bent to form the upright portion is at the interior side of the metal piece such that the upright portion is formed by bending the part of the metal piece from the interior side of the metal piece toward the exterior side of the metal piece,
   wherein the upright portion comprises a trapezoidal shape,
   wherein the mounting portion comprises an uneven portion formed on a side surface of part of the mounting portion at a longitudinal end of the solid electrolytic capacitor, and the exterior resin covers the uneven portion,
   wherein the mounting portion of the anode terminal further comprises a terminal expansion portion, which is part of the metal piece configuring the mounting portion and the upright portion,
   wherein the terminal expansion portion is formed on a first plane, on which the mounting portion is also formed,
   wherein the terminal expansion portion extends in a lateral direction which is parallel to a shorter dimension of the solid electrolytic capacitor, the lateral direction being perpendicular to a longitudinal direction which is parallel to a longer dimension of the solid electrolytic capacitor,
   wherein the terminal expansion portion is exposed at a side surface of the solid electrolytic capacitor in a second plane which extends in the longitudinal direction and intersects the first plane, and
   wherein the upright portion is closer to the exterior side than the terminal expansion portion is.

* * * * *